US012485831B2

(12) United States Patent
Inaba

(10) Patent No.: US 12,485,831 B2
(45) Date of Patent: Dec. 2, 2025

(54) DISPLAY DEVICE

(71) Applicant: Panasonic Automotive Systems Co., Ltd., Kanagawa (JP)

(72) Inventor: Yasunobu Inaba, Kanagawa Ken (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

(21) Appl. No.: 19/056,087

(22) Filed: Feb. 18, 2025

(65) Prior Publication Data

US 2025/0276657 A1 Sep. 4, 2025

(30) Foreign Application Priority Data

Feb. 29, 2024 (JP) ................. 2024-030558

(51) Int. Cl.
*B60R 11/02* (2006.01)
*B60K 35/22* (2024.01)
*B60R 1/08* (2006.01)
*B60R 11/00* (2006.01)

(52) U.S. Cl.
CPC .......... *B60R 11/0229* (2013.01); *B60K 35/22* (2024.01); *B60R 1/088* (2013.01); *B60R 2011/0021* (2013.01); *B60R 2011/0033* (2013.01); *B60R 2011/0071* (2013.01)

(58) Field of Classification Search
None
See application file for complete search history.

(56) References Cited

U.S. PATENT DOCUMENTS

| | | | | |
|---|---|---|---|---|
| 4,253,633 | A | * 3/1981 | Takegawa | ................ B60R 1/06 248/222.12 |
| 9,132,470 | B2 | * 9/2015 | Pausch | .................. B60N 2/818 |
| 11,007,950 | B2 | * 5/2021 | Urata | ..................... B60R 11/00 |
| 2012/0187260 | A1 | * 7/2012 | Moyer | .................... H04M 1/04 248/201 |
| 2020/0010021 | A1 | * 1/2020 | Urata | ..................... B60R 11/00 |
| 2023/0236456 | A1 | 7/2023 | Kitajima | |

FOREIGN PATENT DOCUMENTS

JP 2023-109630 A 8/2023

* cited by examiner

*Primary Examiner* — Talha M Nawaz
(74) *Attorney, Agent, or Firm* — GREENBLUM & BERNSTEIN, P.L.C.

(57) ABSTRACT

A display device includes a display extending in first and second direction and having a first frame, and a second frame. The first frame forms a first end face extending along the first direction and a second end face extending along the first direction on a side opposite to the first end face. The first end face includes a first protrusion. The second frame extends in a frame-like shape in the first direction and the second direction, and includes a first inner face extending along the first direction and a second inner face extending along the first direction on a side opposite to the first inner face. The first inner face includes a first claw portion fittable to the first protrusion, and a first contact member capable of abutting on the second end face is located at a position on the second inner face corresponding to the first claw portion.

14 Claims, 14 Drawing Sheets

DISPLAY DEVICE

CROSS-REFERENCE TO RELATED APPLICATIONS

This application is based upon and claims the benefit of priority from Japanese Patent Application No. 2024-030558, filed on Feb. 29, 2024, the entire contents of which are incorporated herein by reference.

FIELD

The present disclosure relates to a display device.

BACKGROUND

A display device such as an electronic mirror is sometimes configured by fitting a frame to a display. In such a case, it is desirable to properly position the display with respect to the frame.

DETAILED DESCRIPTION

Hereinafter, an embodiment of a display device according to the present disclosure will be described with reference to the drawings.

Embodiment

The display device according to the embodiment is configured by fitting a frame to a display, and is devised to properly position the display with respect to the frame.

Figure 1:
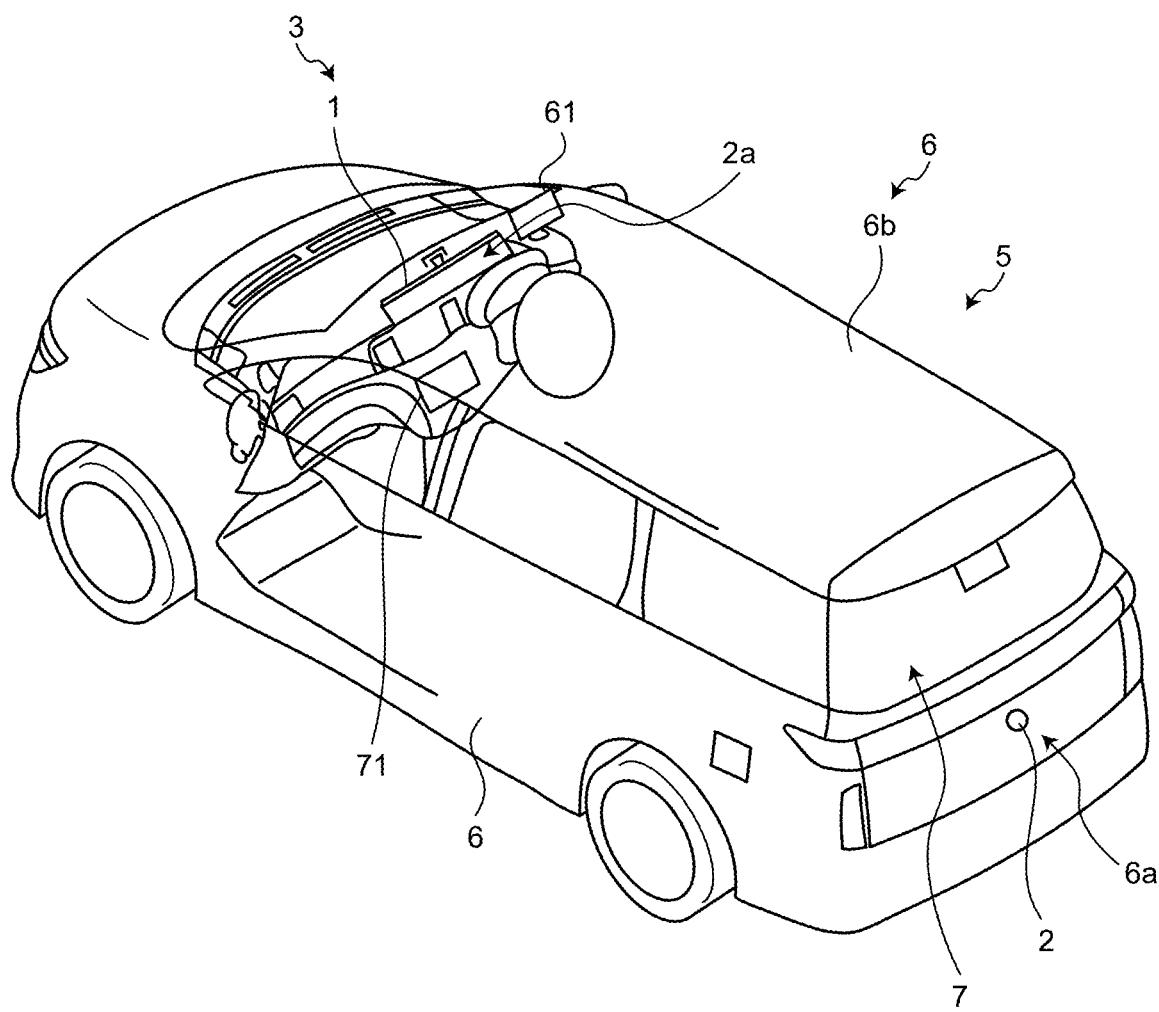
FIG. 1 is a perspective view illustrating a configuration of a vehicle to which a display system including a display device according to an embodiment is mounted.

A display system 3 including a display device 1 according to the embodiment can be mounted to a vehicle 5 as illustrated in FIG. 1. For example, the display device 1 is an electronic mirror, and the display system 3 is an electronic mirror system. FIG. 1 is a diagram illustrating the vehicle 5 to which the display system 3 is mounted. The display system 3 includes the display device 1 and an imaging device 2.

The imaging device 2 is a vehicle-mounted camera mounted to the vehicle 5, and is installed outside or inside a vehicle body 6. The imaging device 2 may be installed at an end on the rear side of the vehicle body 6 to capture an image behind the vehicle, may be installed at an end near a door of the vehicle body 6 to capture a side image, or may be installed at an end on the front side of the vehicle body 6 to capture an image in front of the vehicle body 6.

The display device 1 is disposed in a vehicle interior 7. The display device 1 is, for example, an electronic mirror, has a surface 1a, and is configured to display an image acquired by the imaging device 2 on the surface 1a. The display device 1 is configured to be switchable between a display mode and a mirror mode. The display mode is a mode in which a display panel of the display device 1 displays an image captured by the imaging device 2 and the display device 1 functions as a display. The mirror mode is a mode in which the display panel of the display device 1 is turned off and the display device 1 functions as a mirror.

In a case where the display device 1 is an electronic mirror for rear viewing, the display device 1 may be mounted in the form of a rearview mirror, the surface 1a may face the vehicle interior 7, and the shape of the surface 1a may be the shape of a mirror surface of the rearview mirror. In a case where the display device 1 is an electronic mirror for side viewing, the display device 1 may be mounted in the form of a door mirror (for example, door mirror 61), a surface 2a may face toward the rear of the vehicle body 6, and the shape of the surface 2a may be the shape of a mirror surface of the door mirror. In a case where the display device 1 is an electronic mirror for forward viewing, the display device 1 may be mounted in the form of a vehicle-mounted display device (for example, display device 71), the surface 1a may face the vehicle interior 7, and the shape of the surface 1a may be the shape of a display unit of the display device.

FIG. 1 illustrates a configuration in which the imaging device 2 is installed at a rear end 6a of the vehicle body 6 and the display device 1 is applied to an electronic mirror system for rear viewing. The electronic mirror system for rear viewing is also called an electronic rearview mirror. The imaging device 2 acquires an image behind the vehicle body. The display device 1 can display an image behind the vehicle body captured by the imaging device 2.

Figure 2:
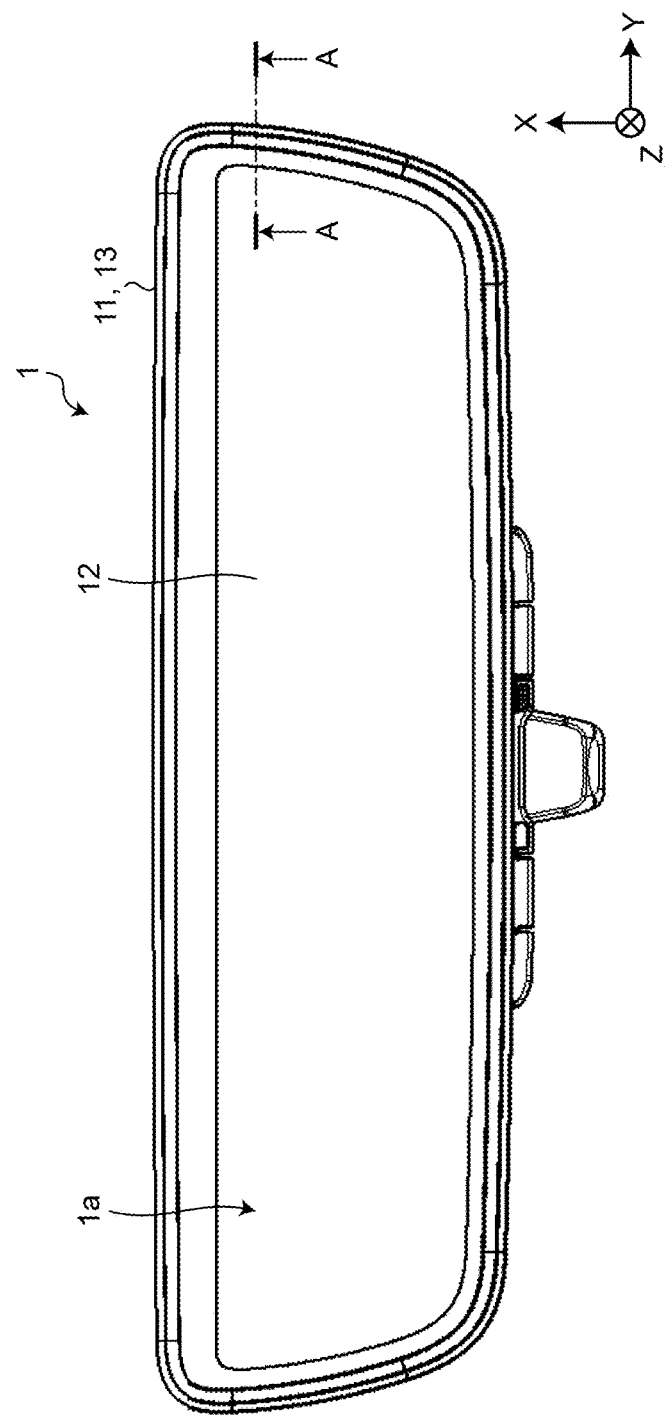
FIG. 2 is a front view illustrating an external configuration of the display device according to the embodiment.
Figure 3:
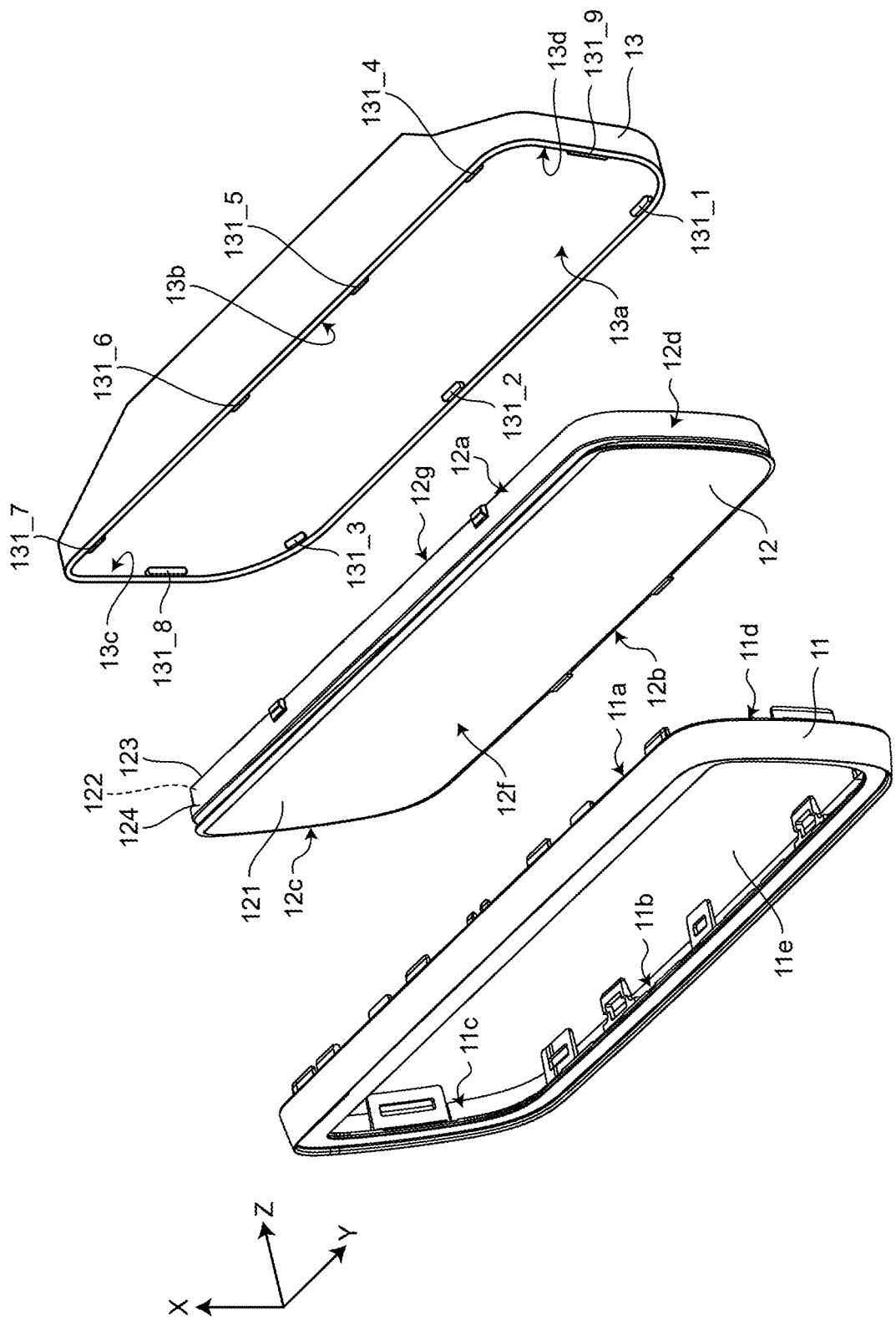
FIG. 3 is an exploded perspective view illustrating a configuration of the display device according to the embodiment.

In a case where the display device 1 is an electronic mirror for rear viewing, the display device 1 can be configured as illustrated in FIGS. 2 and 3. FIG. 2 is a front view illustrating an external configuration of the display device 1. FIG. 3 is an exploded perspective view illustrating a configuration of the display device 1. Hereinafter, a longitudinal direction of the display device 1 is defined as a Y direction, a direction perpendicular to the surface 1a is defined as a Z direction, and a direction perpendicular to the Y direction and the Z direction is defined as an X direction.

The display device 1 includes a frame (second frame) 11, a display 12, and a housing 13.

The frame 11 is disposed on the −Z side of the display 12 and the housing 13. The frame 11 extends in a frame-like shape in the XY direction. The frame 11 has an opening 11e inside. The frame 11 has a shape corresponding to an outer contour of the display 12. The frame 11 is configured to be fittable to the display 12 from the −Z side. The frame 11 may have a substantially rectangular frame-like shape whose longitudinal direction is the Y direction. The frame 11 may have a substantially rectangular frame-like shape with rounded corners. The frame 11 may be made of a material containing resin as a main component.

The frame 11 has inner faces 11a to 11d. Each of the inner faces 11a to 11d faces the inside of the frame 11. The inner face 11a is disposed on the +X side of the frame 11 and extends in the Y direction. The inner face 11b is disposed on the −X side of the frame 11 and extends in the Y direction. The inner face 11c is disposed on the −Y side of the frame 11 and extends in the X direction. The inner face 11d is disposed on the +Y side of the frame 11 and extends in the X direction.

The display 12 is disposed on the +Z side of the frame 11 and on the −Z side of the housing 13. The display 12 extends in a plate-like shape in the XY direction. The display 12 may have a substantially rectangular plate-like shape whose longitudinal direction is the Y direction. The display 12 may have a substantially rectangular frame-like shape with rounded corners.

The display 12 includes a display body 121, a light guide plate 122, a case 123, and a frame 124. The frame 124 forms end faces 12a to 12d and a back face 12g of the display 12. The display body 121 forms a front face 12f of the display 12. In the frame (first frame) 124, at least parts in the vicinity of the end faces 12a to 12d may be made of a material containing metal as a main component.

The end faces 12a to 12d correspond to the inner faces 11a to 11d, respectively. The end face 12a is disposed on the +X side of the display 12 and extends along the Y direction. The end face 12b is disposed on the −X side of the display 12 and extends along the Y direction. The end face 12c is disposed on the −Y side of the display 12 and extends along the X direction. The end face 12d is disposed on the +Y side of the display 12 and extends along the X direction.

The front face 12f is disposed on the −Z side of the display 12 and extends along the XY direction. The back face 12g is disposed on the +Z side of the display 12 and extends along the XY direction.

The housing 13 is disposed on the +Z side of the frame 11 and the display 12. The housing 13 generally has a substantially box shape with the −Z side open. The housing 13 is configured to be able to be fitted to the frame 11 from the +Z side, and is configured to be able to house the display 12 from the +Z side. The housing 13 may be fittable to the frame 11 with the frame 11 fitted to the display 12. The housing 13 may have a substantially box shape whose longitudinal direction is the Y direction. The housing 13 may have a substantially box shape that is open on the −Z side with rounded corners.

The housing 13 has inner faces 13a to 13d.

The inner faces 13a to 13d correspond to the inner faces 11a to 11d, respectively. The inner face 13a is disposed on the +X side of the housing 13 and extends along the Y direction. The inner face 13b is disposed on the −X side of the housing 13 and extends along the Y direction. The inner face 13c is disposed on the −Y side of the housing 13 and extends along the X direction. The inner face 13d is disposed on the +Y side of the housing 13 and extends along the X direction.

In a state where the frame 11 is fitted to the frame 124 and the housing 13 is fitted to the frame 11, each of the end faces 12a to 12d faces the corresponding the inner faces 11a to 11d, the front face 12f is exposed to the −Z side, and the back face 12g is exposed to the +Z side. The front face 12f has an outer edge facing the frame 11 and an inner portion exposed through the opening 11e. The back face 12g faces the housing 13. The frame 11 constitutes a part of a casing of the display device 1, and the housing 13 constitutes another part of the casing of the display device 1.

Figure 4:
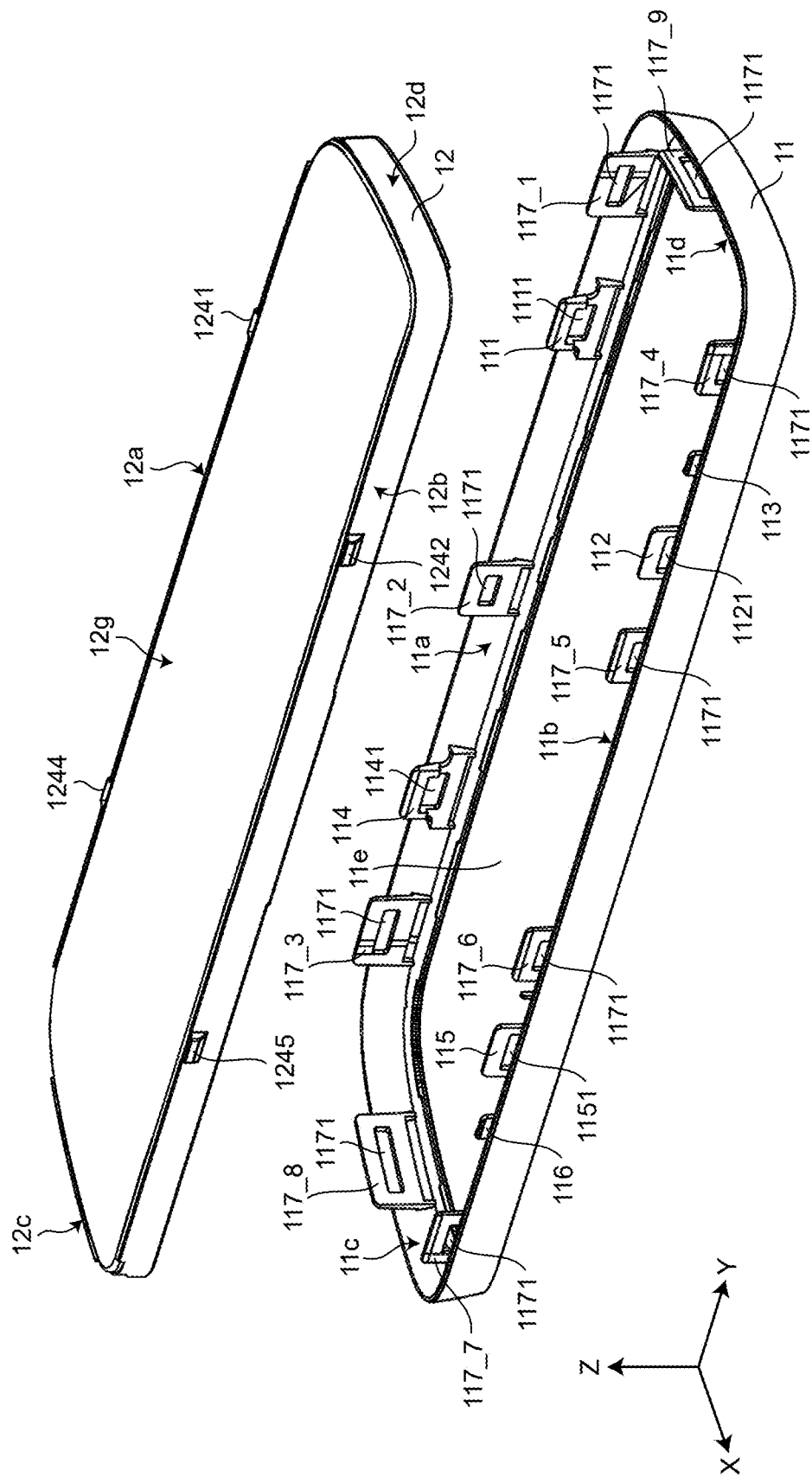
FIG. 4 is a perspective view illustrating a configuration of a frame and a display according to the embodiment.
Figure 5:
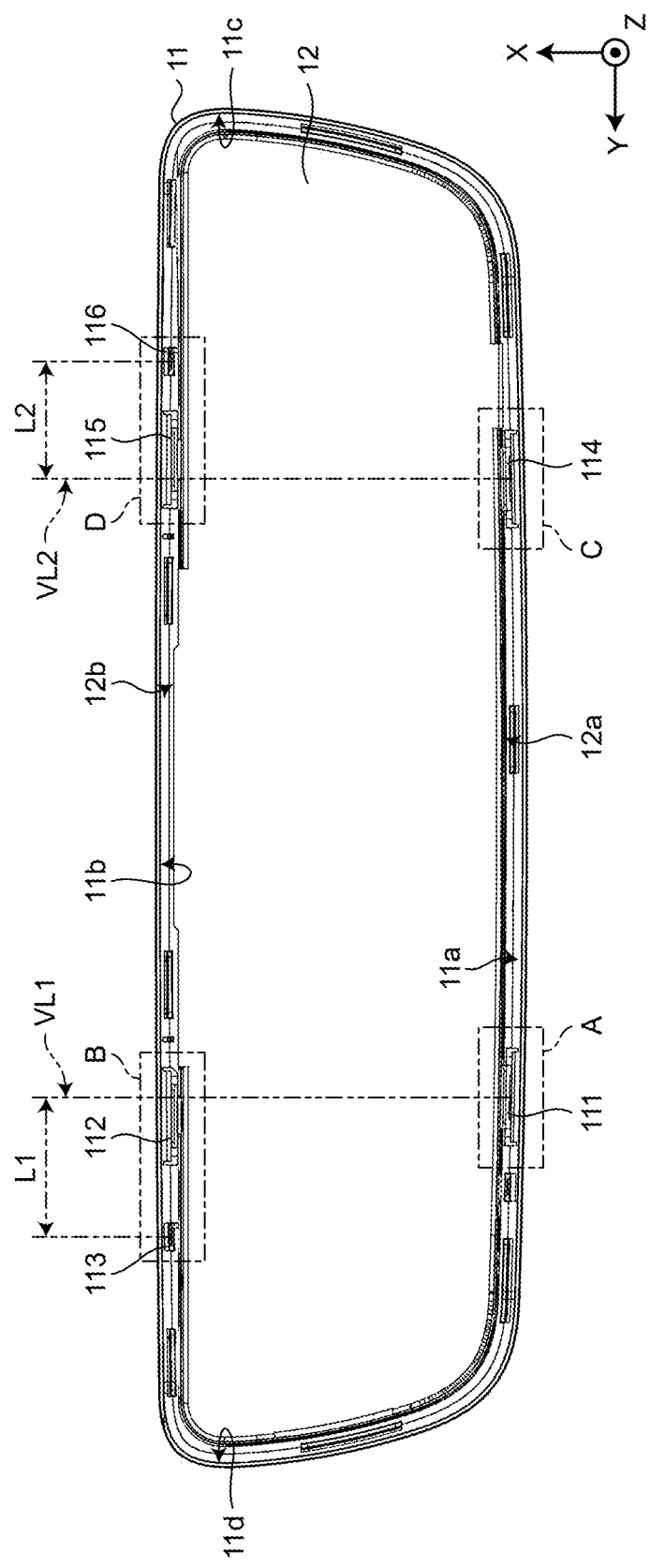
FIG. 5 is a front view illustrating a configuration of the frame and the display according to the embodiment.
Figure 6:
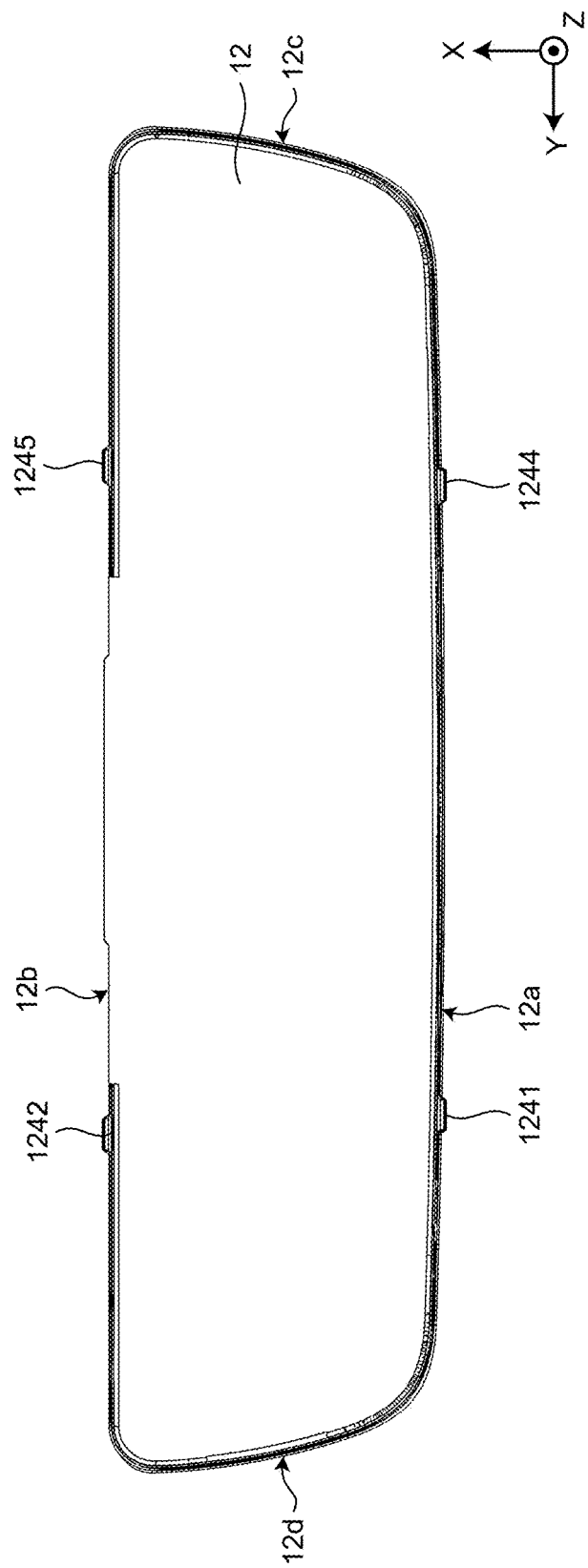
FIG. 6 is a front view illustrating a configuration of the display according to the embodiment.

Next, detailed configurations of the frame 11 and the display 12 will be described with reference to FIGS. 4 to 6. FIG. 4 is a perspective view illustrating the configuration of the frame 11 and the display 12. FIG. 5 is a front view illustrating the configuration of the frame 11 and the display 12, and illustrates a state in which the frame 11 is attached to the display 12. FIG. 6 is a front view illustrating the configuration of the display 12, and illustrates a state in which the frame 11 is not attached.

The frame 124 has a protrusion 1241 and a protrusion 1244 on the end face 12a, and a protrusion 1242 and a protrusion 1245 on the end face 12b.

The protrusion 1241 is disposed at a position on the +Y side with respect to the center of the end face 12a, and protrudes to the −X side from the end face 12a. The protrusion 1241 may be disposed on the +Z side at a position on the +Y side with respect to the center of the end face 12a. In the protrusion 1241, the longitudinal direction is the Y direction. The protrusion 1241 may have a substantially rectangular shape in the YZ plane view.

The protrusion 1244 is disposed at a position on the −Y side with respect to the center of the end face 12a, and protrudes to the −X side from the end face 12a. The protrusion 1244 may be disposed on the +Z side at a position on the −Y side with respect to the center of the end face 12a. In the protrusion 1244, the longitudinal direction is the Y direction. The protrusion 1244 may have a substantially rectangular shape in the YZ plane view.

The protrusion 1242 is disposed at a position on the +Y side with respect to the center of the end face 12b, and protrudes to the +X side from the end face 12b. The protrusion 1242 may be disposed on the +Z side at a position on the +Y side with respect to the center of the end face 12b. In the protrusion 1242, the longitudinal direction is the Y direction. The protrusion 1242 may have a substantially rectangular shape in the YZ plane view.

The protrusion 1245 is disposed at a position on the −Y side with respect to the center of the end face 12b, and protrudes to the +X side from the end face 12b. The protrusion 1245 may be disposed on the +Z side at a position on the −Y side with respect to the center of the end face 12b. In the protrusion 1245, the longitudinal direction is the Y direction. The protrusion 1245 may have a substantially rectangular shape in the YZ plane view.

The frame 11 has a claw portion 111 and a claw portion 114 on the inner face 11a, and has a claw portion 112, a contact member 113, a claw portion 115, and a contact member 116 on the inner face 11b.

The claw portion 111 corresponds to the protrusion 1241 and is disposed at a position on the +Y side with respect to the center of the inner face 11a. The claw portion 111 extends in the Z direction on the inner face 11a. The claw portion 111 extends from an end on the −Z side of the inner face 11a to a Z position beyond an end on the +Z side thereof. The claw portion 111 has an opening 1111 at a position corresponding to the protrusion 1241. In the opening 1111, the longitudinal direction is the Y direction. The opening 1111 may have a substantially rectangular shape in the YZ plane view. Accordingly, the claw portion 111 can be fitted to the protrusion 1241.

Figure 7:
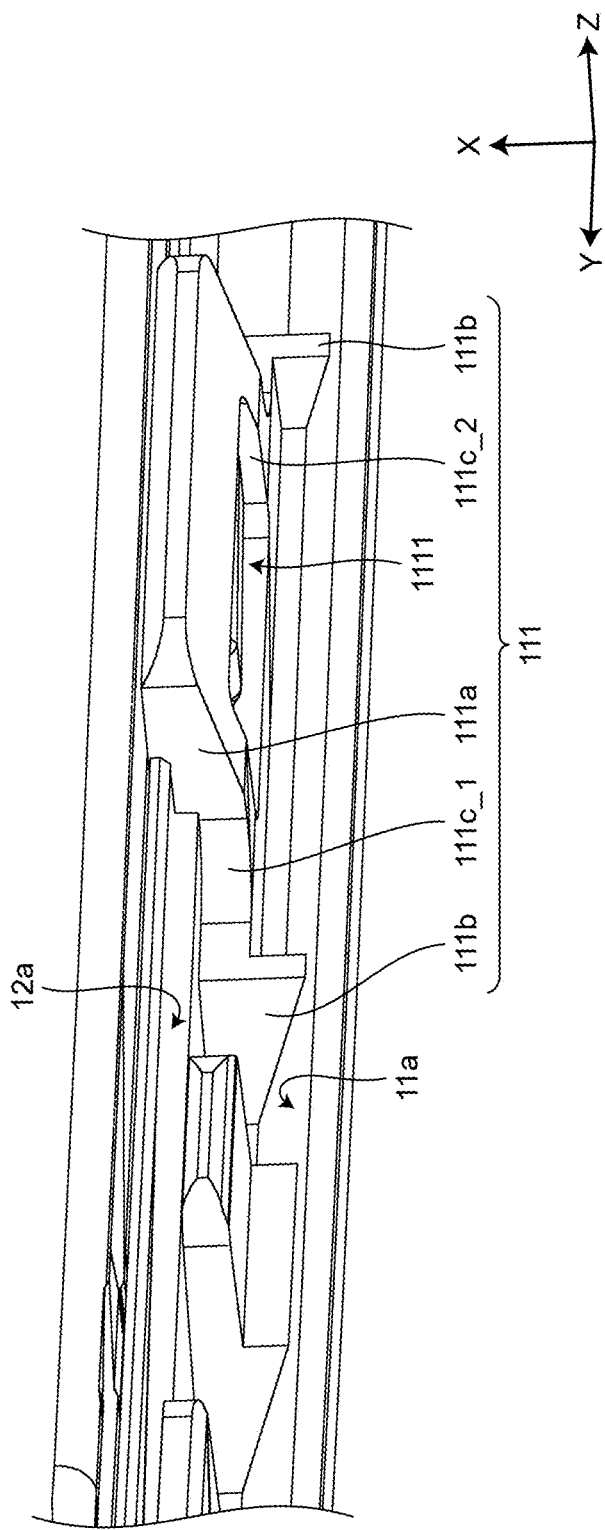
FIG. 7 is an enlarged perspective view illustrating a configuration of a claw portion according to the embodiment.
Figure 8:
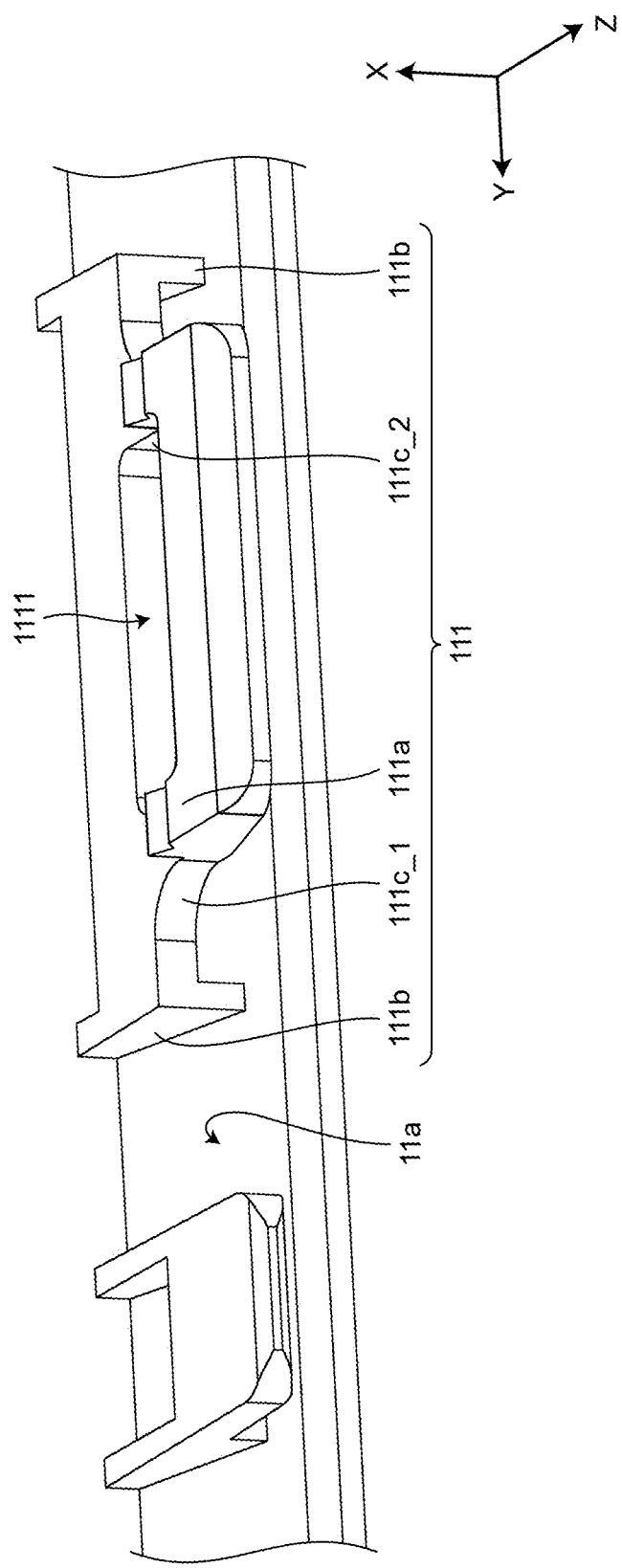
FIG. 8 is an enlarged perspective view illustrating a configuration of the claw portion according to the embodiment.

As illustrated in FIGS. 7 and 8, the claw portion 111 has a part 111a, a part 111b, and a plurality of parts 111c. FIGS. 7 and 8 are enlarged perspective views illustrating the configuration of the claw portion 111, and are enlarged perspective views of a section A in FIG. 5. The part 111a is spaced from the part 111b in the Z direction. The part 111a is located on the tip side of the claw portion 111. The part 111b is spaced from the part 111a in the Z direction. The part 111b is located on the base side of the claw portion 111. The plurality of parts 111c includes a part 111c_1 disposed on the +Y side and a part 111c_2 disposed on the −Y side. The plurality of parts 111c is spaced from each other in the Y direction. Each of the plurality of parts 111c is connected between the part 111a and the part 111b along the Z direction. Each of the plurality of parts 111c has a width in the Y direction smaller than that of each of the parts 111a and 111b. Each of the plurality of parts 111c has a thickness in the X direction smaller than that of the part 111a. This allows the claw portion 111 to function as a member for preventing the display 12 from coming off and also to function as a leaf spring.

The claw portion 112 illustrated in FIGS. 4 and 5 corresponds to the protrusion 1242 and is disposed at a position on the +Y side with respect to the center of the inner face 11b. The claw portion 112 extends in the Z direction on the inner face 11b. The claw portion 112 extends from an end on the −Z side of the inner face 11b to a Z position beyond an end on the +Z side thereof. The claw portion 112 has an opening 1121 at a position corresponding to the protrusion 1242. In the opening 1121, the longitudinal direction is the Y direction. The opening 1121 may have a substantially rectangular shape in the YZ plane view. Accordingly, the claw portion 112 can be fitted to the protrusion 1242.

Figure 9:
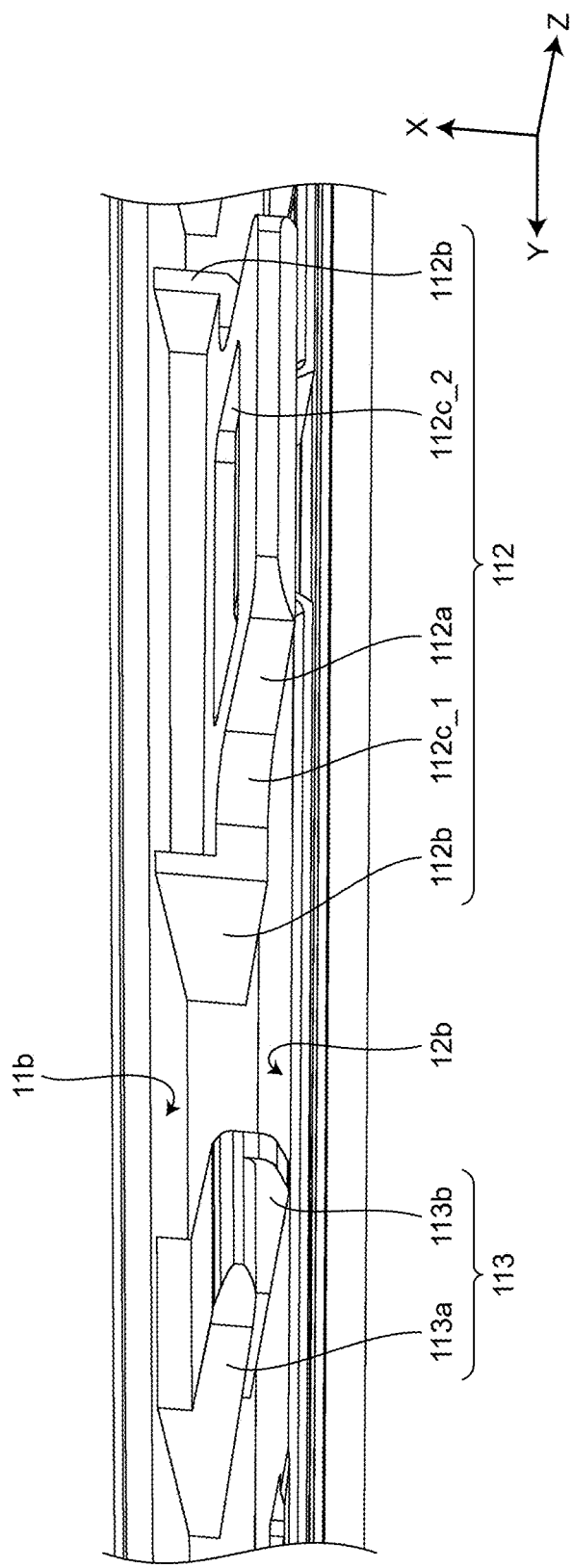
FIG. 9 is an enlarged perspective view illustrating a configuration of the claw portion and a contact member according to the embodiment.

As illustrated in FIG. 9, the claw portion 112 has a part 112a, a part 112b, and a plurality of parts 112c. FIG. 9 is an enlarged perspective view illustrating the configuration of the claw portion 112 and the contact member 113, and is an enlarged perspective view of a section B in FIG. 5. The part 112a is spaced from the part 112b in the Z direction. The part 112a is located on the tip side of the claw portion 112. The part 112b is spaced from the part 112a in the Z direction. The part 112b is located on the base side of the claw portion 112. The plurality of parts 112c includes a part 112c_1 disposed on the +Y side and a part 112c_2 disposed on the −Y side. The plurality of parts 112c is spaced from each other in the Y direction. Each of the plurality of parts 112c is connected between the part 112a and the part 112b along the Z direction. Each of the plurality of parts 112c has a width in the Y direction smaller than that of each of the parts 112a and 112b. Each of the plurality of parts 112c has a thickness in the X direction equivalent to that of the part 112a. This allows the claw portion 112 to function as a member for preventing the display 12 from coming off.

The contact member 113 is disposed at a position on the +Y side with respect to the center of the inner face 11b. The contact member 113 extends in the Z direction on the inner face 11b. The contact member 113 extends from an end on the −Z side of the inner face 11b to a Z position beyond an end on the +Z side thereof. Accordingly, the contact member 113 can abut on the inner face 11b at a position corresponding to the claw portion 111 on the inner face 11b.

As illustrated in FIG. 9, the contact member 113 has a part 113a and a part 113b. The part 113a extends from an end on the −Z side of the inner face 11b to a Z position beyond an end on the +Z side thereof. The part 113b is connected to the part 113a along the X direction and extends from an end on the −Z side of the inner face 11b to a Z position beyond an end on the +Z side thereof. The part 113b has a width in the Y direction smaller than that of the part 113a. Accordingly, the contact member 113 has relatively high rigidity in the X direction, and the inner face 11b can be used as a reference contact surface.

Here, the contact member 113 illustrated in FIGS. 4 and 5 is disposed at a position on the inner face 11b corresponding to the claw portion 111. The contact member 113 is present within a Y-direction threshold distance Lth with respect to a virtual straight line VL1 passing through the claw portion 111 and extending in the X direction. A Y-direction distance L1 (see FIG. 5) between the contact member 113 and the claw portion 111 is equal to or less than the Y-direction threshold distance Lth. The Y-direction threshold distance Lth can be experimentally determined in advance as a distance at which the display 12 can be positioned by the cooperation of the claw portion 111 and the contact member 113. The Y-direction threshold distance Lth may be, for example, 30 mm.

In a state where the frame 11 is fitted to the frame 124, the part 111a abuts on the end face 12a. The part 111b is spaced from the end face 12a in the X direction. Each of the parts 111c_1 and 111c_2 is spaced from the end face 12a in the X direction. The part 113a is spaced from the end face 12b in the X direction. The part 113b abuts on the end face 12b.

The elastic modulus of the claw portion 111 in the X direction is higher than the elastic modulus of the contact member 113 in the X direction and higher than the elastic modulus of the claw portion 112 in the X direction. The rigidity of the contact member 113 in the X direction is higher than the rigidity of the claw portion 111 in the X direction and higher than the rigidity of the claw portion 112 in the X direction. Accordingly, the contact member 113 can use the inner face 11b as a reference contact surface, the claw portion 111 functions as a leaf spring to bias the frame 124 toward the inner face 11b, and the display 12 can be positioned in the X direction.

The claw portion 114 corresponds to the protrusion 1244 and is disposed at a position on the −Y side with respect to the center of the inner face 11a. The claw portion 114 extends in the Z direction on the inner face 11a. The claw portion 114 extends from an end on the −Z side of the inner face 11a to a Z position beyond an end on the +Z side thereof. The claw portion 114 has an opening 1141 at a position corresponding to the protrusion 1244. In the opening 1141, the longitudinal direction is the Y direction. The opening 1141 may have a substantially rectangular shape in the YZ plane view. Accordingly, the claw portion 114 can be fitted to the protrusion 1244.

Figure 10:
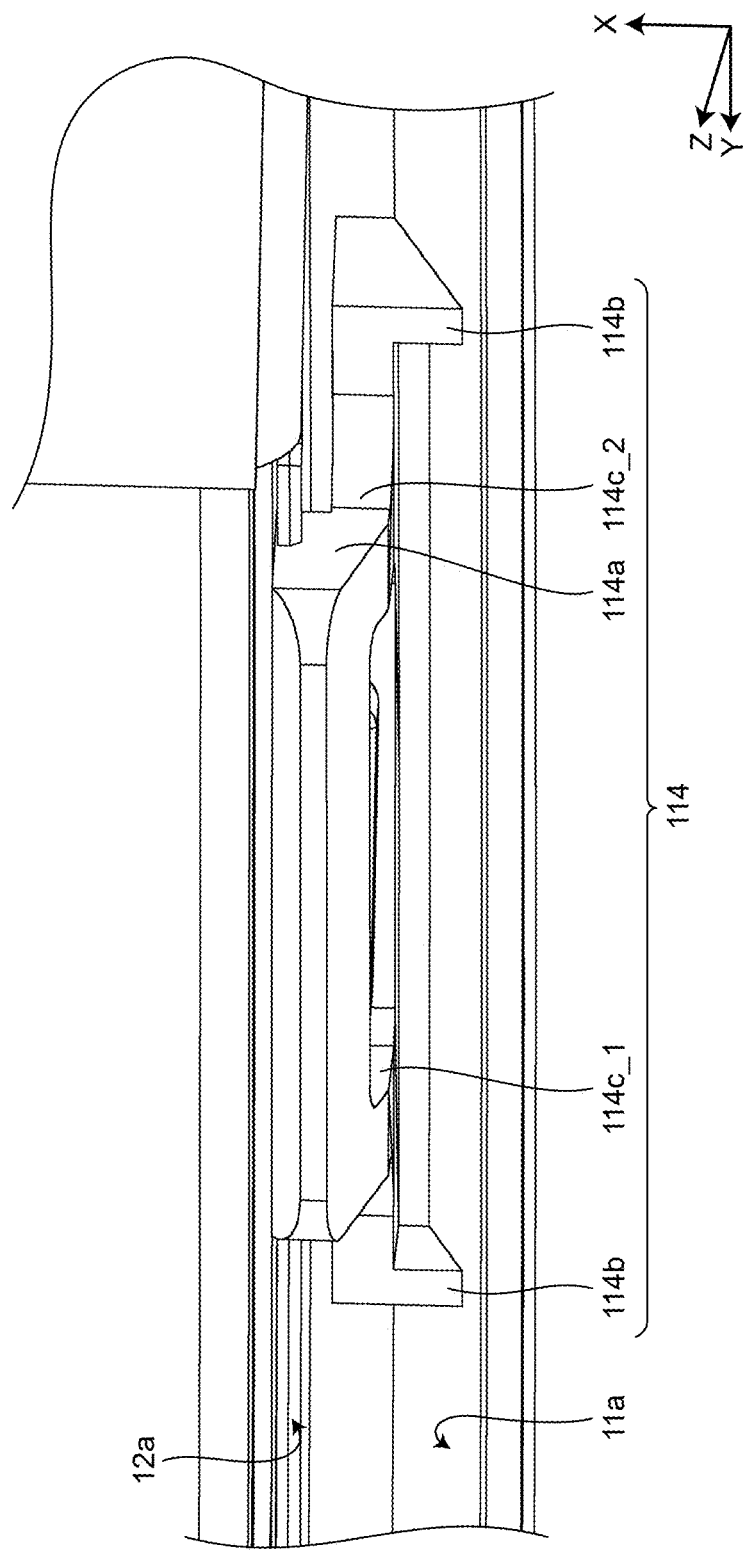
FIG. 10 is an enlarged perspective view illustrating a configuration of the claw portion according to the embodiment.
Figure 11:
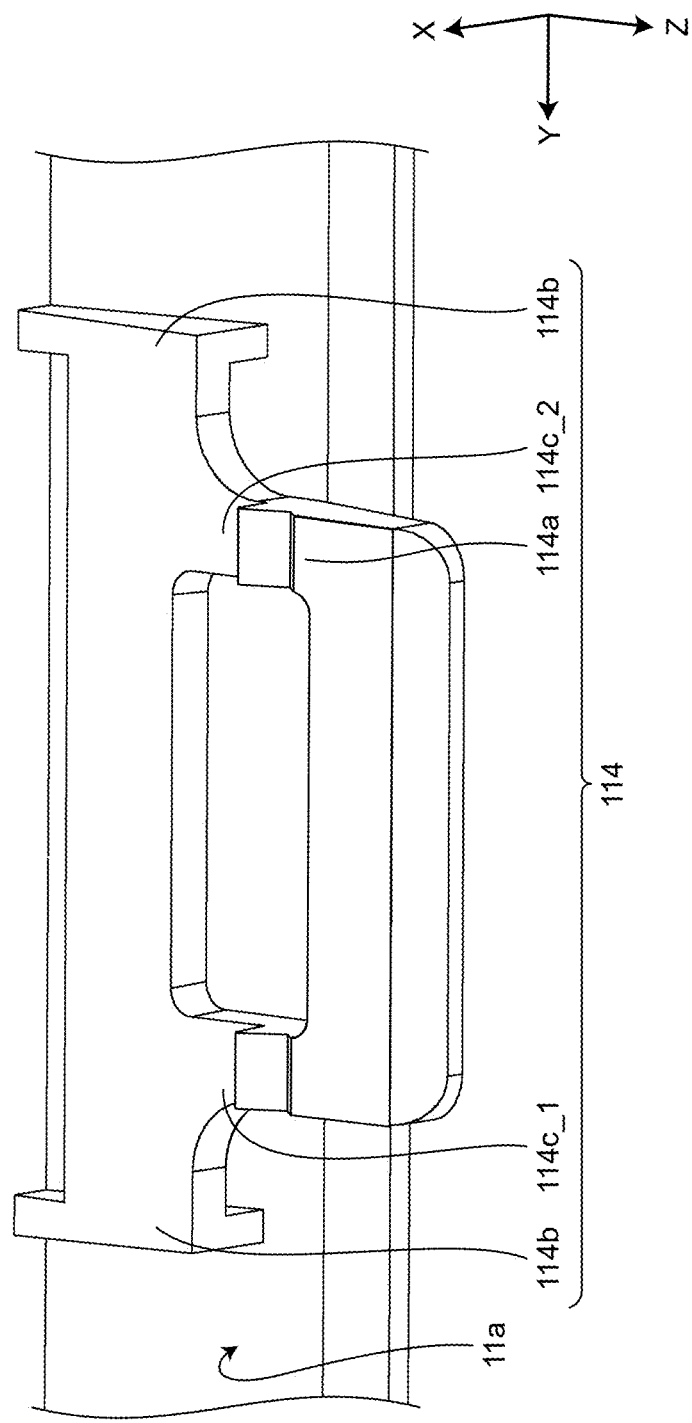
FIG. 11 is an enlarged perspective view illustrating a configuration of the claw portion according to the embodiment.

As illustrated in FIGS. 10 and 11, the claw portion 114 has a part 114a, a part 114b, and a plurality of parts 114c. FIGS. 10 and 11 are enlarged perspective views illustrating the configuration of the claw portion 114, and are enlarged perspective views of a section C in FIG. 5. The part 114a is spaced from the part 114b in the Z direction. The part 114a is located on the tip side of the claw portion 114. The part 114b is spaced from the part 114a in the Z direction. The part 114b is located on the base side of the claw portion 114. The plurality of parts 114c includes a part 114c_1 disposed on the +Y side and a part 114c_2 disposed on the −Y side. The plurality of parts 114c is spaced from each other in the Y direction. Each of the plurality of parts 114c is connected between the part 114a and the part 114b along the Z direction. Each of the plurality of parts 114c has a width in the Y direction smaller than that of each of the parts 114a and 114b. Each of the plurality of parts 114c has a thickness in the X direction smaller than that of the part 114a. This allows the claw portion 114 to function as a member for preventing the display 12 from coming off and also to function as a leaf spring.

The claw portion 115 illustrated in FIGS. 4 and 5 corresponds to the protrusion 124S and is disposed at a position on the −Y side with respect to the center of the inner face 11b. The claw portion 115 extends in the Z direction on the inner face 11b. The claw portion 115 extends from an end on the −Z side of the inner face 11b to a Z position beyond an end on the +Z side thereof. The claw portion 115 has an opening 1151 at a position corresponding to the protrusion 124S. In the opening 1151, the longitudinal direction is the Y direction. The opening 1151 may have a substantially rectangular shape in the YZ plane view. Accordingly, the claw portion 115 can be fitted to the protrusion 124S.

Figure 12:
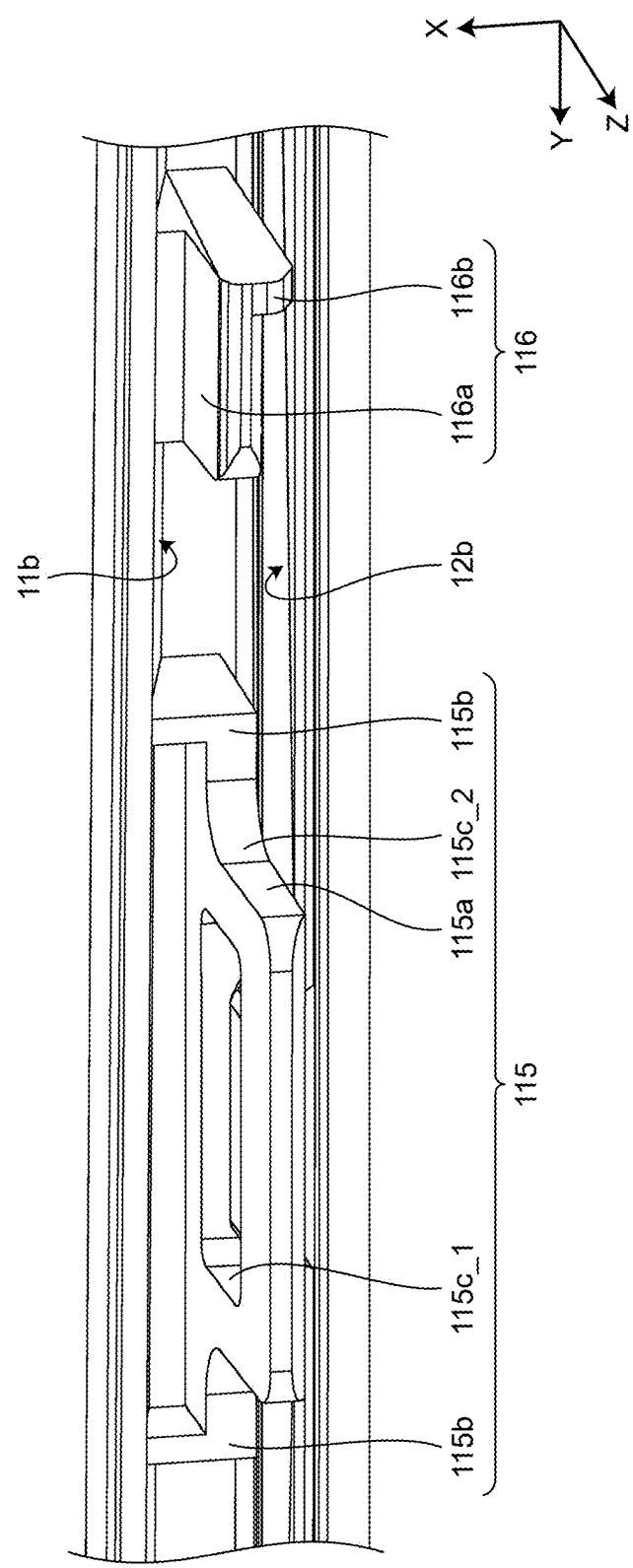
FIG. 12 is an enlarged perspective view illustrating a configuration of the claw portion and the contact member according to the embodiment.

As illustrated in FIG. 12, the claw portion 115 has a part 115a, a part 115b, and a plurality of parts 115c. FIG. 12 is an enlarged perspective view illustrating the configuration of the claw portion 115 and the contact member 116, and is an enlarged perspective view of a section D in FIG. 5. The part 115a is spaced from the part 115b in the Z direction. The part 115a is located on the tip side of the claw portion 115. The part 115b is spaced from the part 115a in the Z direction. The part 115b is located on the base side of the claw portion 115. The plurality of parts 115c includes a part 115c_1 disposed on the +Y side and a part 115c_2 disposed on the −Y side. The plurality of parts 115c is spaced from each other in the Y direction. Each of the plurality of parts 115c is connected between the part 115a and the part 115b along the Z direction. Each of the plurality of parts 115c has a width in the Y direction smaller than that of each of the parts 115a and 115b. Each of the plurality of parts 115c has a thickness in the X direction equivalent to that of the part 115a. This allows the claw portion 115 to function as a member for preventing the display 12 from coming off.

The contact member 116 is disposed at a position on the −Y side with respect to the center of the inner face 11b. The contact member 116 extends in the Z direction on the inner face 11b. The contact member 116 extends from an end on the −Z side of the inner face 11b to a Z position beyond an end on the +Z side thereof. Accordingly, the contact member 116 can abut on the inner face 11b at a position corresponding to the claw portion 114 on the inner face 11b.

As illustrated in FIG. 12, the contact member 116 has a part 116a and a part 116b. The part 116a extends from an end on the −Z side of the inner face 11b to a Z position beyond an end on the +Z side thereof. The part 116b is connected to the part 116a along the X direction and extends from an end on the −Z side of the inner face 11b to a Z position beyond an end on the +Z side thereof. The part 116b has a width in the Y direction smaller than that of the part 116a. Accordingly, the contact member 116 has relatively high rigidity in the X direction, and the inner face 11b can be used as a reference contact surface.

Here, the contact member 116 is disposed at a position on the inner face 11b corresponding to the claw portion 114. The contact member 116 is present within a Y-direction threshold distance Lth with respect to a virtual straight line VL2 passing through the claw portion 114 and extending in the X direction. A Y-direction distance L2 (see FIG. 5) between the contact member 116 and the claw portion 114 is equal to or less than the Y-direction threshold distance Lth. The Y-direction threshold distance Lth can be experimentally determined in advance as a distance at which the display 12 can be positioned by the cooperation of the claw portion 114 and the contact member 116. The Y-direction threshold distance Lth may be, for example, 30 mm.

In a state where the frame 11 is fitted to the frame 124, the part 114a abuts on the end face 12a. The part 114b is spaced from the end face 12a in the X direction. Each of the parts 114c_1 and 114c_2 is spaced from the end face 12a in the X direction. The part 116a is spaced from the end face 12b in the X direction. The part 116b abuts on the end face 12b.

The elastic modulus of the claw portion 114 in the X direction is higher than the elastic modulus of the contact member 116 in the X direction and higher than the elastic modulus of the claw portion 115 in the X direction. The rigidity of the contact member 116 in the X direction is higher than the rigidity of the claw portion 114 in the X direction and higher than the rigidity of the claw portion 115 in the X direction. Accordingly, the contact member 116 can use the inner face 11b as a reference contact surface, the claw portion 114 functions as a leaf spring to bias the display 12 toward the inner face 11b, and the display 12 can be positioned in the X direction.

Next, detailed configurations of the frame 11 and the housing 13 will be described with reference to FIGS. 3 and 4.

The housing 13 illustrated in FIG. 3 has protrusions 131_1 to 131_3 on the inner face 13a, protrusions 131_4 to 131_7 on the inner face 13b, a protrusion 131_8 on the inner face 13c, and a protrusion 131_9 on the inner face 13d.

The protrusion 131_1 is disposed at a position on the +Y side with respect to the center of the inner face 13a, and protrudes to the +X side from the inner face 13a. The protrusion 131_1 may be disposed on the −Z side at a position on the +Y side with respect to the center of the inner face 13a. In the protrusion 131_1, the longitudinal direction is the Y direction. The protrusion 131_1 may have a substantially rectangular shape in the YZ plane view.

The protrusion 131_2 is disposed at a position near the center of the inner face 13a, and protrudes toward the +X side from the inner face 13a. The protrusion 131_2 may be disposed on the −Z side at a position near the center of the inner face 13a. In the protrusion 131_2, the longitudinal direction is the Y direction. The protrusion 131_2 may have a substantially rectangular shape in the YZ plane view.

The protrusion 131_3 is disposed at a position on the −Y side with respect to the center of the inner face 13a, and protrudes toward the +X side from the inner face 13a. The protrusion 131_3 may be disposed on the −Z side at a position on the −Y side with respect to the center of the inner face 13a. In the protrusion 131_3, the longitudinal direction is the Y direction. The protrusion 131_3 may have a substantially rectangular shape in the YZ plane view.

The protrusion 131_4 is disposed at a position on the +Y side with respect to the center of the inner face 13b, and protrudes toward the −X side from the inner face 13b. The protrusion 131_4 may be disposed on the −Z side at a position on the +Y side with respect to the center of the inner face 13b. In the protrusion 131_4, the longitudinal direction is the Y direction. The protrusion 131_4 may have a substantially rectangular shape in the YZ plane view.

The protrusion 131_5 is disposed at a position on the +Y side with respect to the center of the inner face 13b and on the −Y side with respect to the protrusion 131_4, and protrudes toward the −X side from the inner face 13b. The protrusion 131_5 may be disposed on the −Z side at a position on the +Y side with respect to the center of the inner face 13*b* and on the −Y side with respect to the protrusion 131_4. In the protrusion 131_5, the longitudinal direction is the Y direction. The protrusion 131_5 may have a substantially rectangular shape in the YZ plane view.

The protrusion 131_7 is disposed at a position on the −Y side with respect to the center of the inner face 13*b*, and protrudes toward the −X side from the inner face 13*b*. The protrusion 131_7 may be disposed on the −Z side at a position on the −Y side with respect to the center of the inner face 13*b*. In the protrusion 131_7, the longitudinal direction is the Y direction. The protrusion 131_7 may have a substantially rectangular shape in the YZ plane view.

The protrusion 131_6 is disposed at a position on the −Y side with respect to the center of the inner face 13*b* and on the +Y side with respect to the protrusion 131_7, and protrudes toward the −X side from the inner face 13*b*. The protrusion 131_6 may be disposed on the −Z side at a position on the −Y side with respect to the center of the inner face 13*b* and on the +Y side with respect to the protrusion 131_7. In the protrusion 131_6, the longitudinal direction is the Y direction. The protrusion 131_6 may have a substantially rectangular shape in the YZ plane view.

The protrusion 131_8 is disposed at a position near the center of the inner face 13*c*, and protrudes toward the +Y side from the inner face 13*c*. The protrusion 131_8 may be disposed on the −Z side at a position near the center of the inner face 13*c*. In the protrusion 131_8, the longitudinal direction is the X direction. The protrusion 131_8 may have a substantially rectangular shape in the XZ plane view.

The protrusion 131_9 is disposed at a position near the center of the inner face 13*d*, and protrudes toward the −Y side from the inner face 13*d*. The protrusion 131_9 may be disposed on the −Z side at a position near the center of the inner face 13*d*. In the protrusion 131_9, the longitudinal direction is the X direction. The protrusion 131_9 may have a substantially rectangular shape in the XZ plane view.

The frame 11 has claw portions 117_1 to 117_3 on the inner face 11*a*, claw portions 117_4 to 117_7 on the inner face 11*b*, a claw portion 117_8 on the inner face 11*c*, and a claw portion 117_9 on the inner face 11*d*.

The claw portion 117_1 corresponds to the protrusion 131_1 and is disposed at a position on the +Y side with respect to the center of the inner face 11*a*. The claw portion 117_1 extends in the Z direction on the inner face 11*a*. The claw portion 117_1 extends from an end on the −Z side of the inner face 11*a* to a Z position beyond an end on the +Z side thereof. The claw portion 117_1 has an opening 1171 at a position corresponding to the protrusion 131_1. In the opening 1171, the longitudinal direction is the Y direction. The opening 1171 may have a substantially rectangular shape in the YZ plane view. Accordingly, the claw portion 117_1 can be fitted to the protrusion 131_1.

The claw portion 117_2 corresponds to the protrusion 131_2 and is disposed at a position near the center of the inner face 11*a*. The claw portion 117_2 extends in the Z direction on the inner face 11*a*. The claw portion 117_2 extends from an end on the −Z side of the inner face 11*a* to a Z position beyond an end on the +Z side thereof. The claw portion 117_2 has an opening 1171 at a position corresponding to the protrusion 131_2. In the opening 1171, the longitudinal direction is the Y direction. The opening 1171 may have a substantially rectangular shape in the YZ plane view. Accordingly, the claw portion 117_2 can be fitted to the protrusion 131_2.

The claw portion 117_3 corresponds to the protrusion 131_3 and is disposed at a position on the −Y side with respect to the center of the inner face 11*a*. The claw portion 117_3 extends in the Z direction on the inner face 11*a*. The claw portion 117_3 extends from an end on the −Z side of the inner face 11*a* to a Z position beyond an end on the +Z side thereof. The claw portion 117_3 has an opening 1171 at a position corresponding to the protrusion 131_3. In the opening 1171, the longitudinal direction is the Y direction. The opening 1171 may have a substantially rectangular shape in the YZ plane view. Accordingly, the claw portion 117_3 can be fitted to the protrusion 131_3.

The claw portion 117_4 corresponds to the protrusion 131_4 and is disposed at a position on the +Y side with respect to the center of the inner face 11*b*. The claw portion 117_4 extends in the Z direction on the inner face 11*b*. The claw portion 117_4 extends from an end on the −Z side of the inner face 11*b* to a Z position beyond an end on the +Z side thereof. The claw portion 117_4 has an opening 1171 at a position corresponding to the protrusion 131_4. In the opening 1171, the longitudinal direction is the Y direction. The opening 1171 may have a substantially rectangular shape in the YZ plane view. Accordingly, the claw portion 117_4 can be fitted to the protrusion 131_4.

The claw portion 117_5 corresponds to the protrusion 131_5 and is disposed at a position on the +Y side with respect to the center of the inner face 11*b* and on the −Y side with respect to the claw portion 117_4. The claw portion 117_5 extends in the Z direction on the inner face 11*b*. The claw portion 117_5 extends from an end on the −Z side of the inner face 11*b* to a Z position beyond an end on the +Z side thereof. The claw portion 117_5 has an opening 1171 at a position corresponding to the protrusion 131_5. In the opening 1171, the longitudinal direction is the Y direction. The opening 1171 may have a substantially rectangular shape in the YZ plane view. Accordingly, the claw portion 117_5 can be fitted to the protrusion 131_5.

The claw portion 117_7 corresponds to the protrusion 131_7 and is disposed at a position on the −Y side with respect to the center of the inner face 11*b*. The claw portion 117_7 extends in the Z direction on the inner face 11*b*. The claw portion 117_7 extends from an end on the −Z side of the inner face 11*b* to a Z position beyond an end on the +Z side thereof. The claw portion 117_7 has an opening 1171 at a position corresponding to the protrusion 131_7. In the opening 1171, the longitudinal direction is the Y direction. The opening 1171 may have a substantially rectangular shape in the YZ plane view. Accordingly, the claw portion 117_7 can be fitted to the protrusion 131_7.

The claw portion 117_6 corresponds to the protrusion 131_6 and is disposed at a position on the −Y side with respect to the center of the inner face 11*b* and on the +Y side with respect to the claw portion 117_7. The claw portion 117_6 extends in the Z direction on the inner face 11*b*. The claw portion 117_6 extends from an end on the −Z side of the inner face 11*b* to a Z position beyond an end on the +Z side thereof. The claw portion 117_6 has an opening 1171 at a position corresponding to the protrusion 131_6. In the opening 1171, the longitudinal direction is the Y direction. The opening 1171 may have a substantially rectangular shape in the YZ plane view. Accordingly, the claw portion 117_6 can be fitted to the protrusion 131_6.

The claw portion 117_8 corresponds to the protrusion 131_8 and is disposed at a position near the center of the inner face 11*c*. The claw portion 117_8 extends in the Z direction on the inner face 11*c*. The claw portion 117_8 extends from an end on the −Z side of the inner face 11*c* to a Z position beyond an end on the +Z side thereof. The claw portion 117_8 has an opening 1171 at a position corresponding to the protrusion 131_8. In the opening 1171, the longitudinal direction is the Y direction. The opening 1171 may have a substantially rectangular shape in the YZ plane view. Accordingly, the claw portion 117_8 can be fitted to the protrusion 131_8.

The claw portion 117_9 corresponds to the protrusion 131_9 and is disposed at a position near the center of the inner face 11d. The claw portion 117_9 extends in the Z direction on the inner face 11d. The claw portion 117_9 extends from an end on the −Z side of the inner face 11d to a Z position beyond an end on the +Z side thereof. The claw portion 117_9 has an opening 1171 at a position corresponding to the protrusion 131_9. In the opening 1171, the longitudinal direction is the Y direction. The opening 1171 may have a substantially rectangular shape in the YZ plane view. Accordingly, the claw portion 117_9 can be fitted to the protrusion 131_9.

As described above, in the present embodiment, the frame 11 of the display device 1 has, on the inner face 11a, the claw portions 111 and 114 that can be fitted to the protrusions 1241 and 1244 of the end face 12a of the frame 124, and has, on the inner face 11b, the contact members 113 and 116 that can abut on the end face 12b of the display 12. The elastic modulus of the claw portion 111 in the X direction is higher than the elastic modulus of the contact member 113 in the X direction and higher than the elastic modulus of the claw portion 112 in the X direction. The rigidity of the contact member 113 in the X direction is higher than the rigidity of the claw portion 111 in the X direction and higher than the rigidity of the claw portion 112 in the X direction. Accordingly, the contact member 113 can use the inner face 11b as a reference contact surface, and the claw portion 111 functions as a leaf spring to bias the display 12 toward the inner face 11b. Therefore, the display 12 can be properly positioned in the X direction with respect to the frame 11.

Figure 13:
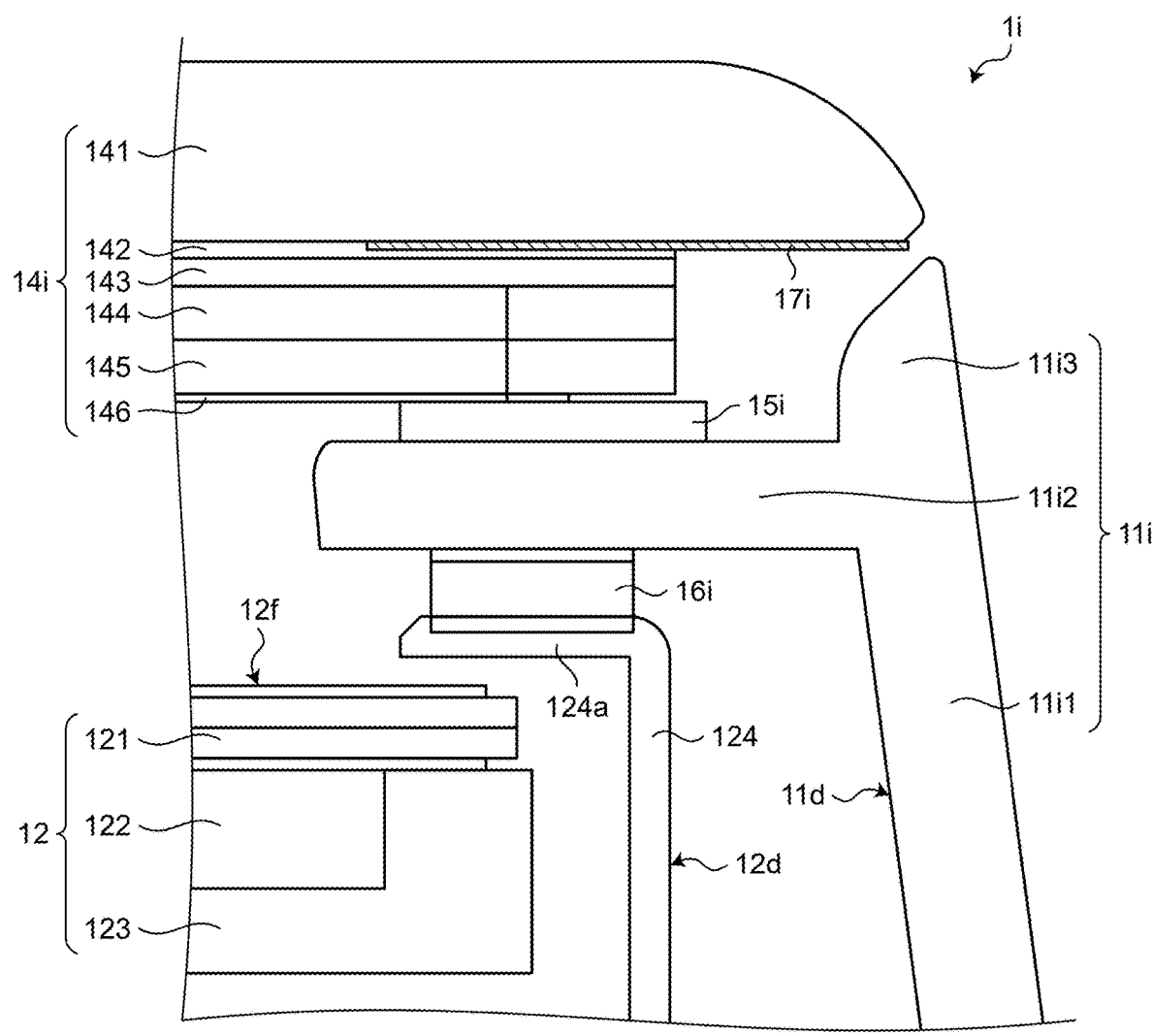
FIG. 13 is an enlarged cross-sectional view illustrating a configuration of a frame according to a first modification to the embodiment.

As a first modification to the embodiment, as illustrated in FIG. 13, a display device 1i may be configured such that a frame 11i corresponds to an optical member 14i. FIG. 13 is an enlarged cross-sectional view illustrating a configuration of the frame 11i according to the first modification to the embodiment, and illustrates a cross section corresponding to a cross section taken along line A-A in FIG. 2.

The display device 1i illustrated in FIG. 13 includes the frame 11i instead of the frame 11 (see FIG. 3), and further includes the optical member 14i, an adhesive layer 15i, an adhesive layer 16i, and a light shielding layer 17i.

The optical member 14i covers the front face 12f of the display 12 in a state where the frame 11i is fitted to the frame 124. The display 12 includes the display body 121, the light guide plate 122, the case 123, and the frame 124, which is similar to the embodiment. The display body 121 extends in a plate-like shape in the XY direction, and a surface of the display body 121 on the −Z side forms the front face 12f. The light guide plate 122 is disposed on the +Z side of the display body 121 and extends in a plate-like shape in the XY direction. The case 123 is disposed on the +Z side of the display body 121 and the light guide plate 122, and abuts on an edge of a surface on the +Z side of the display body 121 while housing the light guide plate 122. The frame 124 is disposed so as to cover the display body 121, the light guide plate 122, and the case 123 from the outside in the XY direction, and the external surface in the XY direction forms the end faces 12a to 12d. The frame 124 may further include a frame portion 124a extending inward in the XY direction from ends on the −Z-side of the end faces 12a to 12d. In the frame 124, at least parts forming the end faces 12a to 12d may be made of a material containing metal as a main component.

The optical member 14i has a translucency. The optical member 14i is also called a cover panel, and can protect the display 12 from an external impact or the like.

The optical member 14i may have a multilayer structure. The optical member 14i includes a cover glass 141, a layer 142, a layer 143, a layer 144, a layer 145, and a layer 146. The layer 146, the layer 145, the layer 144, the layer 143, the layer 142, and the cover glass 141 are stacked in the Z direction in the stated order. Each of the layer 146, the layer 145, the layer 144, the layer 143, the layer 142, and the cover glass 141 extends in a plate-like shape in the XY direction and has a substantially rectangular shape with the longitudinal direction as the X direction. The cover glass 141 may extend in the XY direction beyond the layer 146, the layer 145, the layer 144, the layer 143, and the layer 142. Each of the cover glass 141 and the layers 142 to 146 has a translucency. The layers 142 to 146 are configured to achieve a variable reflectance mirror (VRM) function. In a case where the display device 1i has the VRM capability, the display device 1i may change the reflectance of the display region according to the luminance or the like of the reflected image in the mirror mode.

The frame 11i includes a wall portion 11i1, a frame portion 11i2, and a protruding portion 11i3. The wall portion 11i1 extends in a substantially tubular shape with the Z direction as an axis, and forms the inner faces 11a to 11d. The wall portion 11i1 may have a substantially tubular shape that inclines outward as it extends toward the +Z side. The frame portion 11i2 extends inward in the XY direction from an end on the −Z side of the wall portion 11i1 and covers an edge on the back face of the optical member 14i. The frame portion 11i2 forms the opening 11e (see FIG. 3) for exposing the front face 12f of the display 12. The protruding portion 11i3 protrudes in the −Z direction from an end on the −Z side of the wall portion 11i1. The protruding portion 11i3 may protrude to the vicinity of the outer edge of the cover glass 141 in the XY direction.

The adhesive layer 15i is disposed between the back face of the optical member 14i and a surface on the −Z side of the frame portion 11i2. The adhesive layer 15i may be a member such as a double-sided tape in which an adhesive is applied to a surface on the +Z side and a surface on the −Z side.

The adhesive layer 16i is disposed between a surface on the +Z side of the frame portion 11i2 and a surface on the −Z side of the frame portion 124a. The adhesive layer 16i may be a member such as a double-sided tape in which an adhesive is applied to a surface on the +Z side and a surface on the −Z side.

The light shielding layer 17i is inserted between the back face of the cover glass 141 and the layer 142 in the optical member 14i. The light shielding layer 17i covers an edge on the back face of the cover glass 141. The light shielding layer 17i has an opening corresponding to the opening 11e. This allows the light shielding layer 17i to selectively shield a region corresponding to the frame portion 11i2.

The color of the light shielding layer 17i desirably corresponds to the color of the display region when the surface 1a is observed from the −Z side. The light shielding layer 17i may be formed by depositing a material of a color corresponding to the display region on an edge on the back face of the cover glass 141.

The frame 11i is similar to the embodiment in that the frame 11i has, on the inner face 11a, the claw portions 111 and 114 that can be fitted to the protrusions 1241 and 1244 of the end face 12a of the display 12, and has, on the inner face 11b, the contact members 113 and 116 that can abut on the end face 12b of the display 12.

Also with such a display device 1i, the contact member 113 can use the inner face 11b as a reference contact surface, and the claw portion 111 functions as a leaf spring to bias the display 12 toward the inner face 11b. Therefore, the display 12 can be properly positioned in the X direction with respect to the frame 11i.

Figure 14:
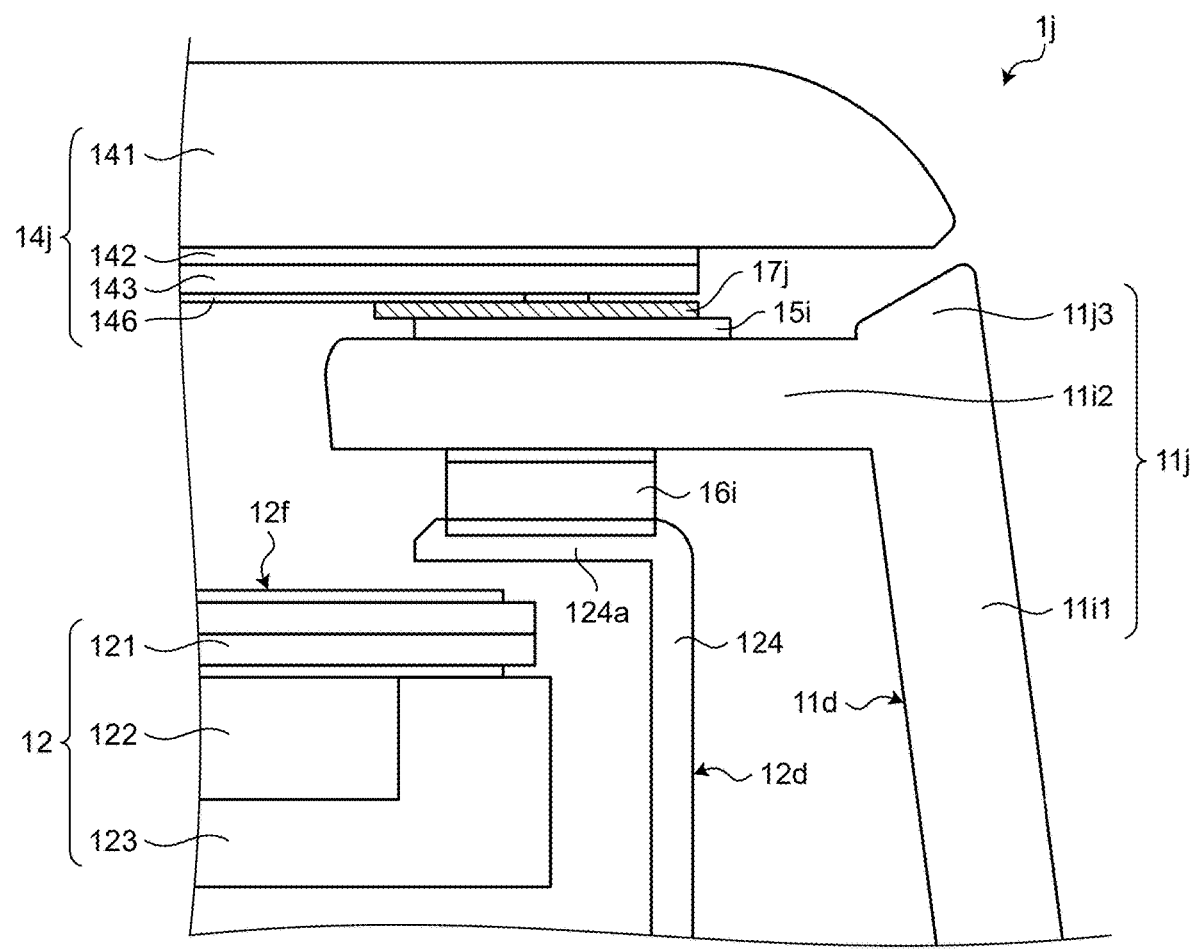
FIG. 14 is an enlarged cross-sectional view illustrating a configuration of a frame according to a second modification to the embodiment.

Alternatively, as a second modification to the embodiment, as illustrated in FIG. 14, a display device 1j may be configured such that a frame 11j corresponds to an optical member 14j. FIG. 14 is an enlarged cross-sectional view illustrating a configuration of the frame 11j according to the second modification to the embodiment, and illustrates a cross section corresponding to a cross section taken along line A-A in FIG. 2.

The display device 1j illustrated in FIG. 14 includes the frame 11j, the optical member 14j, and a light shielding layer 17j in place of the frame 11i, the optical member 14i, and the light shielding layer 17i (see FIG. 13).

In the optical member 14j, the layers 144 and 145 of the optical member 14i are omitted. The layers 142, 143, and 146 has no VRM capability. The optical member 14j corresponds to a small number of layers, and a Z-thickness thereof is smaller than that of the optical member 14i. Other than that, the optical member 14j is similar to the optical member 14i.

In the frame 11j, a Z-height of a protruding portion 11c is smaller than that of a protruding portion 11j3 of the frame 11i. Other than that, the frame 11j is similar to the frame 11i.

The light shielding layer 17j is inserted between the back face of the layer 146 and the adhesive layer 15i. The light shielding layer 17j covers an edge on the back face of the layer 146. The light shielding layer 17j has an opening corresponding to the opening 11e. This allows the light shielding layer 17j to selectively shield a region corresponding to the frame portion 11i2.

The color of the light shielding layer 17j desirably corresponds to the color of the display region when the surface 1a is observed from the −Z side. The light shielding layer 17j may be formed by applying a material of a color corresponding to the display region to the back face of the layer 146, or may be formed by adhering a sheet of a material of a color corresponding to the display region to the back face of the layer 146.

The frame 11j is similar to the embodiment in that the frame 11j has, on the inner face 11a, the claw portions 111 and 114 that can be fitted to the protrusions 1241 and 1244 of the end face 12a of the display 12, and has, on the inner face 11b, the contact members 113 and 116 that can abut on the end face 12b of the display 12.

Also with such a display device 1j, the contact member 113 can use the inner face 11b as a reference contact surface, and the claw portion 111 functions as a leaf spring to bias the display 12 toward the inner face 11b. Therefore, the display 12 can be properly positioned in the X direction with respect to the frame 11j.

Effects of Embodiment

According to the vehicle-mounted camera of the present disclosure, the display can be properly positioned with respect to the frame.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display device comprising:
a display having a first frame; and
a second frame, wherein
the display extends in a plate-like shape in a first direction and a second direction intersecting the first direction,
the first frame forms a first end face extending along the first direction and a second end face extending along the first direction on a side opposite to the first end face,
the first end face includes a first protrusion,
the second frame extends in a frame-like shape in the first direction and the second direction, and includes a first inner face extending along the first direction and a second inner face extending along the first direction on a side opposite to the first inner face,
the first inner face includes a first claw portion that fits to the first protrusion,
a first contact member abutting on the second end face is located at a position on the second inner face corresponding to the first claw portion,
an elastic modulus of the first claw portion in the second direction is higher than an elastic modulus of the first contact member in the second direction, and
a rigidity of the first contact member in the second direction is higher than a rigidity of the first claw portion in the second direction.

2. The display device according to claim 1, wherein
the first contact member is located at a position within a threshold distance from a virtual straight line that passes through the first claw portion and extends in the second direction.

3. The display device according to claim 1, wherein
the first claw portion includes an opening extending from the first inner face in a third direction intersecting the first direction and the second direction and located at a position corresponding to the first protrusion, and
the first contact member extends in the third direction from the second inner face.

4. The display device according to claim 3, wherein
the first claw portion includes:
a first part;
a second part spaced from the first part in the third direction; and
a plurality of third parts spaced from each other in the first direction, each of the plurality of third parts connecting between the first part and the second part along the third direction, each of the plurality of third parts having a thickness smaller than a thickness of the first part in the second direction, and
the first contact member includes:
a fourth part; and
a fifth part connected to the fourth part along the second direction and having a width smaller than a width of the plurality of third parts in the first direction.

5. The display device according to claim 4, wherein
in a state where the second frame is fitted to the first frame, the first part abuts on the first end face, the second part is spaced from the first end face, each of the plurality of third parts is spaced from the second end face, the fourth part is spaced from the second end face, and the fifth part abuts on the second end face.

6. The display device according to claim 1, wherein
the second end face includes a second protrusion, and
the second inner face further includes a second claw portion fittable to the second protrusion.

7. The display device according to claim 6, wherein
an elastic modulus of the first claw portion in the second direction is higher than an elastic modulus of the first contact member in the second direction and is higher than an elastic modulus of the second claw portion in the second direction, and
a rigidity of the first contact member in the second direction is higher than a rigidity of the first claw portion in the second direction and higher than rigidity of the second claw portion in the second direction.

8. The display device according to claim 6, wherein
the first claw portion includes a first opening extending from the first inner face in the second direction and located at a position corresponding to the first protrusion,
the first contact member extends in the second direction from the second inner face, and
the second claw portion includes a second opening extending from the second inner face in the second direction and located at a position corresponding to the second protrusion.

9. The display device according to claim 8, wherein
the first claw portion includes:
 a first part;
 a second part spaced from the first part in a third direction intersecting the first direction and the second direction; and
 a plurality of third parts spaced from each other in the first direction, each of the plurality of third parts connecting between the first part and the second part along the third direction, each of the plurality of third parts having a thickness smaller than a thickness of the first part in the second direction,
the first contact member includes:
 a fourth part; and
 a fifth part connected to the fourth part along the second direction and having a width smaller than a width of the plurality of third parts in the first direction, and
the second claw portion includes:
 a sixth part;
 a seventh part spaced from the sixth part in the third direction; and
 a plurality of eighth parts spaced from each other in the first direction, each of the eighth parts connecting between the sixth part and the seventh part along the third direction, each of the eighth parts having a thickness smaller than a thickness of the sixth part in the second direction.

10. The display device according to claim 1, wherein
the first end face further includes a third protrusion,
the first inner face further includes a third claw portion fittable to the third protrusion, and
the second inner face further includes a second contact member that is located at a position corresponding to the third claw portion and capable of abutting on the second end face.

11. The display device according to claim 1, wherein
the first claw portion is made of a material containing a resin as a main component.

12. The display device according to claim 1, further comprising
a housing that is disposed opposite to the second frame with the display interposed therebetween, has a box shape opening toward the second frame, and has a third inner face extending along the first direction and a fourth inner face extending along the first direction on a side opposite to the third inner face, wherein
the third inner face includes a fourth protrusion,
the fourth inner face includes a fifth protrusion,
the first inner face further includes a fourth claw portion fittable to the fourth protrusion, and
the second inner face further includes a fifth claw portion fittable to the fifth protrusion.

13. The display device according to claim 1, further comprising
a cover panel that has a translucency and covers a front face of the display in a state where the second frame is fitted to the first frame, wherein
the second frame further includes:
 a wall portion that is tubular and forms the first inner face and the second inner face; and
 a frame portion that extends inward from the wall portion and covers an edge on a back face of the cover panel.

14. The display device according to claim 13, wherein
the cover panel includes a light shielding layer that selectively shields a region corresponding to the frame portion.

* * * * *